United States Patent
Seo et al.

(10) Patent No.: US 10,448,389 B1
(45) Date of Patent: Oct. 15, 2019

(54) METHOD FOR TRANSMITTING OR RECEIVING SIGNAL IN WIRELESS COMMUNICATION SYSTEM AND DEVICE FOR PERFORMING THE METHOD

(71) Applicant: LG ELECTRONICS INC., Seoul (KR)

(72) Inventors: Inkwon Seo, Seoul (KR); Yunjung Yi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/212,523

(22) Filed: Dec. 6, 2018

Related U.S. Application Data

(63) Continuation of application No. PCT/KR2018/014370, filed on Nov. 21, 2018.

(60) Provisional application No. 62/596,120, filed on Dec. 8, 2017.

(51) Int. Cl.
*H04W 72/04* (2009.01)
*H04W 72/10* (2009.01)

(52) U.S. Cl.
CPC .......... *H04W 72/042* (2013.01); *H04W 72/10* (2013.01)

(58) Field of Classification Search
CPC ........... H04W 72/042; H04W 72/0446; H04W 72/1289; H04L 5/0053; H04L 5/001; H04L 5/0094
See application file for complete search history.

(56) References Cited

U.S. PATENT DOCUMENTS

| 2010/0316146 A1* | 12/2010 | McBeath | H04L 5/0091 375/260 |
| 2011/0292891 A1* | 12/2011 | Hsieh | H04L 5/001 370/329 |
| 2016/0119900 A1 | 4/2016 | You et al. | |
| 2018/0332505 A1* | 11/2018 | Kim | H04L 5/0064 |
| 2019/0044649 A1* | 2/2019 | Kim | H04L 1/0038 |

(Continued)

OTHER PUBLICATIONS

PCT International Application No. PCT/KR2018/014370, International Search Report dated Mar. 22, 2019, 10 pages.
(Continued)

*Primary Examiner* — Jung H Park
(74) *Attorney, Agent, or Firm* — Lee Hong Degerman Kang & Waimey

(57) ABSTRACT

One aspect of the present disclosure provides a method for detecting, by a user equipment, a PDCCH signal, the method including: receiving configurations for a plurality of search space sets from a base station; determining, based on a monitoring periodicity of each of the plurality of search space sets, search space sets for which the user equipment should monitor a PDCCH signal for a specific unit time; and attempting blind-detection selectively for only a part of PDCCH candidates included in the determined search space sets when a number of PDCCH candidates or a number of CCEs included in the determined search space sets exceed a maximum number of candidates or a maximum number of CCEs, wherein in selection of PDCCH candidates for attempting the blind-detection, the user equipment firstly selects PDCCH candidates from a first search space set related to a CSS among the determined search space sets.

19 Claims, 5 Drawing Sheets

(56) References Cited

U.S. PATENT DOCUMENTS

2019/0045533 A1\* 2/2019 Chatterjee ......... H04W 72/1289

OTHER PUBLICATIONS

Vivo, "Remaining details on NR-PDCCH search space," 3GPP TSG RAN WG1 Meeting 91, R1-1719781, Reno, USA, Nov. 27-Dec. 1, 2017, 7 pages.
Samsung, "Remaining Issues on Search Space Design," 3GPP TSG RAN WG1 Meeting 91, R1-1720320, Reno, USA, Nov. 27-Dec. 1, 2017, 7 pages.
Nokia et al., "Remaining details on search space," 3GPP TSG RAN WG1 Meeting 91, R1-1720507, Reno, USA, Nov. 27-Dec. 1, 2017, 11 pages.
Qualcomm Incorporated, "Remaining issues on control resource set and search space," 3GPP TSG RAN WG1 #91, R1-1720676, Reno, USA, Nov. 27-Dec. 1, 2017, 5 pages.

\* cited by examiner

METHOD FOR TRANSMITTING OR RECEIVING SIGNAL IN WIRELESS COMMUNICATION SYSTEM AND DEVICE FOR PERFORMING THE METHOD

CROSS-REFERENCE TO RELATED APPLICATIONS

This application a continuation of International Application No. PCT/KR2018/014370, filed on Nov. 21, 2018, which claims the benefit of U.S. Provisional Application No. 62/596,120, filed on Dec. 8, 2017, the contents of which are all hereby incorporated by reference herein in their entirety.

TECHNICAL FIELD

The present disclosure relates to a wireless communication system, and more particularly, to a method for transmitting or receiving a downlink control channel signal by a base station or user equipment in a wireless communication system, and a device for performing the method.

BACKGROUND

First, the existing 3GPP LTE/LTE-A system will be briefly described. Referring to FIG. 1, the UE performs an initial cell search (S101). In the initial cell search process, the UE receives a Primary Synchronization Channel (P-SCH) and a Secondary Synchronization Channel (S-SCH) from a base station, performs downlink synchronization with the BS, and acquires information such as a cell ID. Thereafter, the UE acquires system information (e.g., MIB) through a PBCH (Physical Broadcast Channel). The UE can receive the DL RS (Downlink Reference Signal) and check the downlink channel status.

After the initial cell search, the UE can acquire more detailed system information (e.g., SIBs) by receiving a Physical Downlink Control Channel (PDCCH) and a Physical Downlink Control Channel (PDSCH) scheduled by the PDCCH (S102).

The UE may perform a random access procedure for uplink synchronization. The UE transmits a preamble (e.g., Msg1) through a physical random access channel (PRACH) (S103), and receives a response message (e.g., Msg2) for the preamble through PDCCH and PDSCH corresponding to the PDCCH. In the case of a contention-based random access, a contention resolution procedure such as additional PRACH transmission (S105) and PDCCH/PDSCH reception (S106) may be performed.

Then, the UE can perform PDCCH/PDSCH reception (S107) and Physical Uplink Shared Channel (PUSCH)/Physical Uplink Control Channel (PUCCH) transmission (S108) as a general uplink/downlink signal transmission procedure. The UE can transmit UCI (Uplink Control Information) to the BS. The UCI may include HARQ ACK/NACK (Hybrid Automatic Repeat reQuest Acknowledgment/Negative ACK), SR (Scheduling Request), CQI (Channel Quality Indicator), PMI (Precoding Matrix Indicator) and/or RI etc.

DISCLOSURE

Technical Purpose

One purpose of the present disclosure is to provide a method for more efficient and accurate transmission and reception of a PDCCH signal between a user equipment and a base station, and to provide a device for performing the method.

The technical purposes of the present disclosure are not limited to the above-described technical purpose. Other technical purposes may be deduced from embodiments of the present disclosure.

Technical Solution

In one aspect of the present disclosure, there is provided a method for detecting, by a user equipment, a physical downlink control channel (PDCCH) signal in a wireless communication system, the method comprising: receiving configurations for a plurality of search space sets from a base station; determining, based on a monitoring periodicity of each of the plurality of search space sets, search space sets for which the user equipment should monitor a PDCCH signal for a specific unit time; and attempting blind-detection selectively for only a part of PDCCH candidates included in the determined search space sets when a number of PDCCH candidates and a number of control channel elements (CCEs) included in the determined search space sets exceed a maximum number of candidates or a maximum number of CCEs, respectively, wherein in selection of PDCCH candidates for attempting the blind-detection, the user equipment may firstly select PDCCH candidates from a first search space set related to a common search space (CSS) among the determined search space sets.

In another aspect of the present disclosure, there is provided a method for transmitting, by a base station, a physical downlink control channel (PDCCH) signal in a wireless communication system, the method comprising: transmitting configurations for a plurality of search space sets to a user equipment; determining, based on a monitoring periodicity of each of the plurality of search space sets, search space sets for which the user equipment should monitor a PDCCH signal for a specific unit time; determining that only a part of PDCCH candidates included in the determined search space sets can be monitored by the user equipment when a number of PDCCH candidates and a number of control channel elements (CCEs) included in the determined search space sets exceed a maximum number of candidates or a maximum number of CCEs, respectively; and transmitting a PDCCH signal using at least one of the PDCCH candidates can be monitored by the user equipment, wherein the base station may determine the PDCCH candidates can be monitored by the user equipment under assumption that the user equipment firstly selects the PDCCH candidates from a first search space set related to a common search space (CSS) among the determined search space sets.

In still another aspect of the present disclosure, there is provided a user equipment (UE) for detecting a physical downlink control channel (PDCCH) signal, the UE comprising: a receiver; and a processor to receive configurations for a plurality of search space sets via the receiver from a base station, to determine, based on a monitoring periodicity of each of the plurality of search space sets, search space sets for which the user equipment should monitor a PDCCH signal for a specific unit time, and to attempt blind-detection selectively for only a part of PDCCH candidates included in the determined search space sets when a number of PDCCH candidates and a number of control channel elements (CCEs) included in the determined search space sets exceed a maximum number of candidates or a maximum number of CCEs, respectively, wherein in selection of PDCCH candidates for attempting the blind-detection, the processor firstly selects the PDCCH candidates from a first search space set related to a common search space (CSS) among the determined search space sets.

In still yet another aspect of the present disclosure, there is provided a base station (BS) for transmitting a physical downlink control channel (PDCCH) signal, the BS comprising: a transmitter; and a processor to transmit configurations for a plurality of search space sets via the transmitter to a user equipment, to determine, based on a monitoring periodicity of each of the plurality of search space sets, search space sets for which the user equipment should monitor a PDCCH signal for a specific unit time, to determine that only a part of PDCCH candidates included in the determined search space sets can be monitored by the user equipment when a number of PDCCH candidates and a number of control channel elements (CCEs) included in the determined search space sets exceed a maximum number of candidates or a maximum number of CCEs, respectively, and to transmit a PDCCH signal using at least one of the PDCCH candidates can be monitored by the user equipment, wherein the processor determines the PDCCH candidates can be monitored by the user equipment under assumption that the user equipment firstly selects the PDCCH candidates from a first search space set related to a common search space (CSS) among the determined search space sets.

After the user equipment selects the PDCCH candidates from the first search space set, the user equipment may select additional PDCCH candidates for attempting the blind-detection until reaching the maximum number of the candidates or the maximum number of CCEs, from a second search space set corresponding to an user specific search space (USS). The user equipment may determine the second search space set based on a search space set index.

The search space sets determined by the user equipment may include the first search space set, and a plurality of second search space sets related to a user specific search space (USS).

The user equipment may assign a higher priority to a search space set having a lower search space set index among the second search space sets.

The maximum number of candidates and the maximum number of CCEs may are values determined based on a subcarrier spacing (SCS).

The maximum number of candidates may be related to a maximum number of blind-decodings of the user equipment. The maximum number of CCEs may be related to a maximum channel estimation capability of the user equipment.

The number of CCEs included in the determined search space sets may be a number of CCEs non-overlapping with each other.

Technical Effect

According to one embodiment of the present disclosure, both of a problem of exceeding the processing capability of the user equipment and a ambiguity problem in terms of determination of the PDCCH candidate that may be used for PDCCH transmission and reception may be removed which otherwise may occur when the monitoring timings of multiple search space sets are overlapped with each other.

It will be appreciated by persons skilled in the art that the effects that can be achieved through the present invention are not limited to what has been particularly described hereinabove and other advantages of the present invention will be more clearly understood from the following detailed description.

DETAILED DESCRIPTIONS

Figure 1:
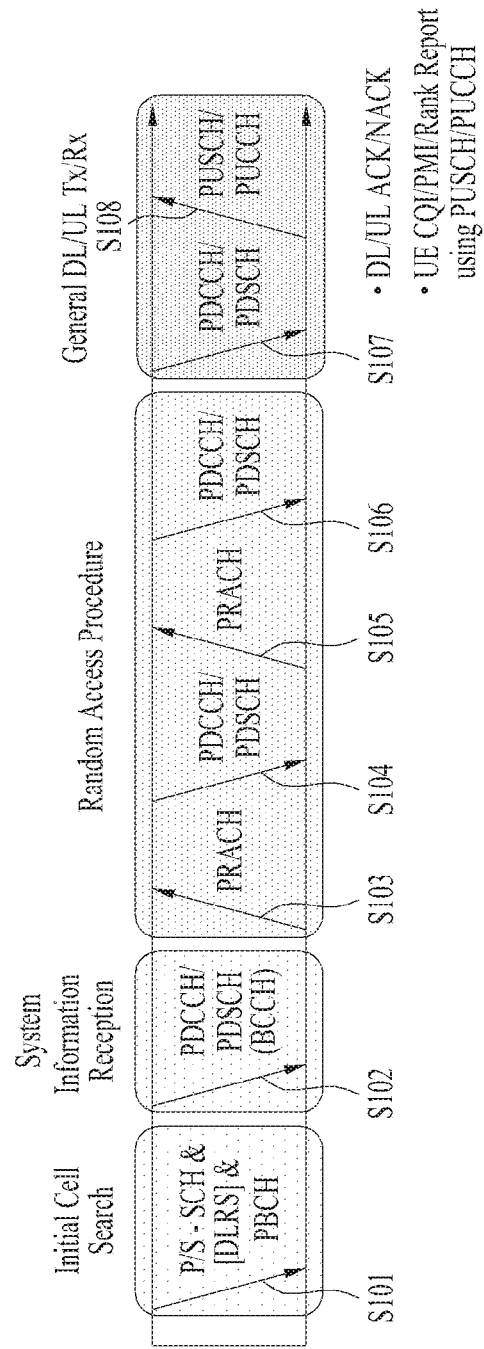
FIG. 1 illustrates physical channels used in 3GPP LTE/LTE-A system and a general signal transmission method using the physical channels.

The following description of embodiments of the present disclosure may apply to various wireless access systems including CDMA (code division multiple access), FDMA (frequency division multiple access), TDMA (time division multiple access), OFDMA (orthogonal frequency division multiple access), SC-FDMA (single carrier frequency division multiple access) and the like. CDMA can be implemented with such a radio technology as UTRA (universal terrestrial radio access), CDMA 2000 and the like. TDMA can be implemented with such a radio technology as GSM/GPRS/EDGE (Global System for Mobile communications)/General Packet Radio Service/Enhanced Data Rates for GSM Evolution). OFDMA can be implemented with such a radio technology as IEEE 802.11 (Wi-Fi), IEEE 802.16 (WiMAX), IEEE 802.20, E-UTRA (Evolved UTRA), etc. UTRA is a part of UMTS (Universal Mobile Telecommunications System). 3GPP (3rd Generation Partnership Project) LTE (long term evolution) is a part of E-UMTS (Evolved UMTS) that uses E-UTRA. 3GPP LTE adopts OFDMA in downlink and adopts SC-FDMA in uplink. LTE-A (LTE-Advanced) is an evolved version of 3GPP LTE.

For clarity, the following description mainly concerns 3GPP LTE system or 3GPP LTE-A system, by which the technical idea of the present disclosure may be non-limited. Specific terminologies used in the following description are provided to help understand the present disclosure and the use of the terminologies can be modified to a different form within a scope of the technical idea of the present disclosure.

As many as possible communication devices have demanded as high as communication capacity and, thus, there has been a need for enhanced mobile broadband (eMBB) communication compared with legacy radio access technology (RAT) in a recently discussed next-generation communication system. In addition, massive machine type communications (mMTC) for connecting a plurality of devices and objects to provide various services anytime and anywhere is also one of factors to be considered in next-generation communication. In addition, in consideration of a service/UE that is sensitive to reliability and latency, ultra-reliable and low latency communication (URLLC) has been discussed for a next-generation communication system.

As such, new RAT that considers eMBB, mMTC, URLCC, and so on has been discussed for next-generation wireless communication.

Some LTE/LTE-A operations and configuration that are not at variance to a design of New RAT may also be applied to new RAT. For convenience, new RAT may be referred to as 5G mobile communication.

<NR Frame Structure and Physical Resource>

In an NR system, downlink (DL) and downlink (UL) transmission may be performed through frames having duration of 10 ms and each frame may include 10 subframes. Accordingly, 1 subframe may correspond to 1 ms. Each frame may be divided into two half-frames.

1 subframe may include $N_{symb}^{subframe,\mu}=N_{symb}^{slot} \times N_{slot}^{subframe,\mu}$ contiguous OFDM symbols. $N_{symb}^{slot}$ represents the number of symbols per slot, μ represents OFDM numerology, and $N_{slot}^{subframe,\mu}$ represents the number of slots per subframe with respect to corresponding μ. In NR, multiple OFDM numerologies shown in Table 1 below may be supported.

TABLE 1

| μ | Δf = $2^\mu$ · 15 [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

In Table 1 above, Δf refers to subcarrier spacing (SCS). μ and cyclic prefix with respect to a DL carrier bandwidth part (BWP) and μ and cyclic prefix with respect to a UL carrier BWP may be configured for a UE via UL signaling.

Table 2 below shows the number of $N_{symb}^{slot}$ of symbols per slot, the number $N_{slot}^{frame,\mu}$ of symbols per frame, and the number $N_{slot}^{subframe,\mu}$ of slots per subframe with respect to each SCS in the case of normal CP.

TABLE 2

| μ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

Table 3 below shows the number $N_{symb}^{slot}$ of symbols per slot, the number $N_{slot}^{frame,\mu}$ of slots per frame, and the number $N_{slot}^{subframe,\mu}$ of slots per subframe with respect to each SCS in the case of extended CP.

TABLE 4

| μ | $N_{symb}^{slot}$ | $N_{slot}^{frame,\mu}$ | $N_{slot}^{subframe,\mu}$ |
|---|---|---|---|
| 2 | 12 | 40 | 4 |

As such, in an NR system, the number of slots included in 1 subframe may be changed according to subcarrier spacing (SCS). OFDM symbols included in each slot may correspond to any one of D (DL), U (UL), and X (flexible). DL transmission may be performed in a D or X symbol and UL transmission may be performed in a U or X symbol. A Flexible resource (e.g., X symbol) may also be referred to as a Reserved resource, an Other resource, or a Unknown resource.

In NR, one resource block (RB) may correspond to 12 subcarriers in the frequency domain. A RB may include a plurality of OFDM symbols. A resource element (RE) may correspond to 1 subcarrier and 1 OFDM symbol. Accordingly, 12 REs may be present on 1 OFDM symbol in 1 RB.

A carrier BWP may be defined as a set of contiguous physical resource blocks (PRBs). The carrier BWP may also be simply referred to a BWP. A maximum of 4 BWPs may be configured for each of UL/DL link in 1 UE. Even if multiple BWPs are configured, 1 BWP may be activated for a given time period. However, when a supplementary uplink (SUL) is configured in a UE, 4 BWPs may be additionally configured for the SUL and 1 BWP may be activated for a given time period. A UE may not be expected to receive a PDSCH, a PDCCH, a channel state information-reference signal (CSI-RS), or a tracking reference signal (TRS) out of the activated DL BWP. In addition, the UE may not be expected to receive a PUSCH or a PUCCH out of the activated UL BWP.

<NR DL Control Channel>

In an NR system, a transmissions NR system, a transmission unit of a control channel may be defined as a resource element group (REG) and/or a control channel element (CCE), etc. The CCE may refer to a minimum unit for control channel transmission. That is, a minimum PDCCH size may correspond to 1 CCE. When an aggregation level is equal to or greater than 2, a network may group a plurality of CCEs to transmit one PDCCH (i.e., CCE aggregation).

An REG may correspond to 1 OFDM symbol in the time domain and may correspond to 1 PRB in the frequency domain. In addition, 1 CCE may correspond to 6 REGs.

A control resource set (CORESET) and a search space (SS) are briefly described now. The CORESET may be a set of resources for control signal transmission and the search space may be aggregation of control channel candidates for perform blind detection. The search space may be configured for the CORESET. For example, when one search space is defined on one CORESET, a CORESET for a common search space (CSS) and a CORESET for a UE-specific search space (USS) may each be configured. As another example, a plurality of search spaces may be defined in one CORESET. For example, the CSS and the USS may be configured for the same CORESET. In the following example, the CSS may refer to a CORESET with a CSS configured therefor and the USS may refer to a CORESET with a USS configured therefor, or the like.

A base station can signal information on a CORESET to a user equipment (UE). For example, a CORESET configuration is signaled to a UE for each CORESET. The CORESET configuration can include time duration of a CORESET (e.g., 1/2/3 symbols), a frequency domain resource of the CORESET, a precoder granularity, an REG-to-CCE mapping type (e.g., interleaved/non-interleaved), in case of the interleaved REG-to-CCE mapping type, an REG bundling size, an interleaver size, and the like.

If REG-to-CCE mapping for 1-symbol CORESET corresponds to the non-interleaved type, 6 REGs for CCE are grouped as a single REG bundle and the REGs for the CCE are consecutive. If there are multiple CCEs within 1 PDCCH (e.g., when an aggregation level is equal to or greater than 2), the CCEs can be consecutive. A UE may assume the same precoding within 1 REG bundle according to a precoder granularity or assume the same precoding for a plurality of REG bundles.

If REG-to-CCE mapping for 1-symbol CORESET corresponds to the interleaved type, 2, 3, or 6 REGs can be configured as 1 REG bundle. For example, it may be able to support such an REG bundle size as {2}, {3}, {2,3}, {2,6}, {3,6}, or {2,3,6} as a subset rather than support all REG bundle sizes of 2, 3, and 6. In case of supporting an REG bundle size of {2,6}, 1 REG bundle can be configured by 2 REGs or 6 REGs. A UE may assume the same precoding within 1 REG bundle or assume the same precoding for a plurality of REGs.

When REG-to-CCE mapping is performed on a CORESET having duration equal to or longer than 2 symbols, it may define an REG bundle in time/frequency domain. If an REG bundle is defined in time domain, all REGs belonging to 1 REG bundle belong to the same RB and the REGs may correspond to symbols different from each other. If an REG bundle is defined in time-frequency domain, 1 REG bundle belongs to the same RB and can include not only REGs corresponding to symbols different from each other but also REGs belonging to a different RB.

When REG-to-CCE mapping is performed on a CORESET having duration equal to or longer than 2 symbols, it may be able to support time-first mapping to the REG-to-CCE mapping. An REG bundle can be configured to be identical to time domain duration of a CORESET in time domain. In case of the non-interleaved type, 6 REGs constructing a CCE may correspond to 1 REG bundle and the REGS of the CCE can be localized in time/frequency domain. In case of the interleaved type, 2, 3, or 6 REGs may correspond to 1 REG bundle and REG bundles can be interleaved within a CORESET. A UE may assume the same precoding within 1 REG bundle according to a precoder granularity or assume the same precoding for a plurality of REG bundles.

Decreasing Channel Estimation Complexity Related to PDCCH Reception

In the LTE system, a aggregation level of control channel candidates that user equipment should monitor on each subframe to receive the PDCCH, and the number of the control channel candidates for each aggregation level are fixed. Therefore, the user equipment attempts blind-decoding on the same number of control channel candidates on each subframe.

Figure 2:
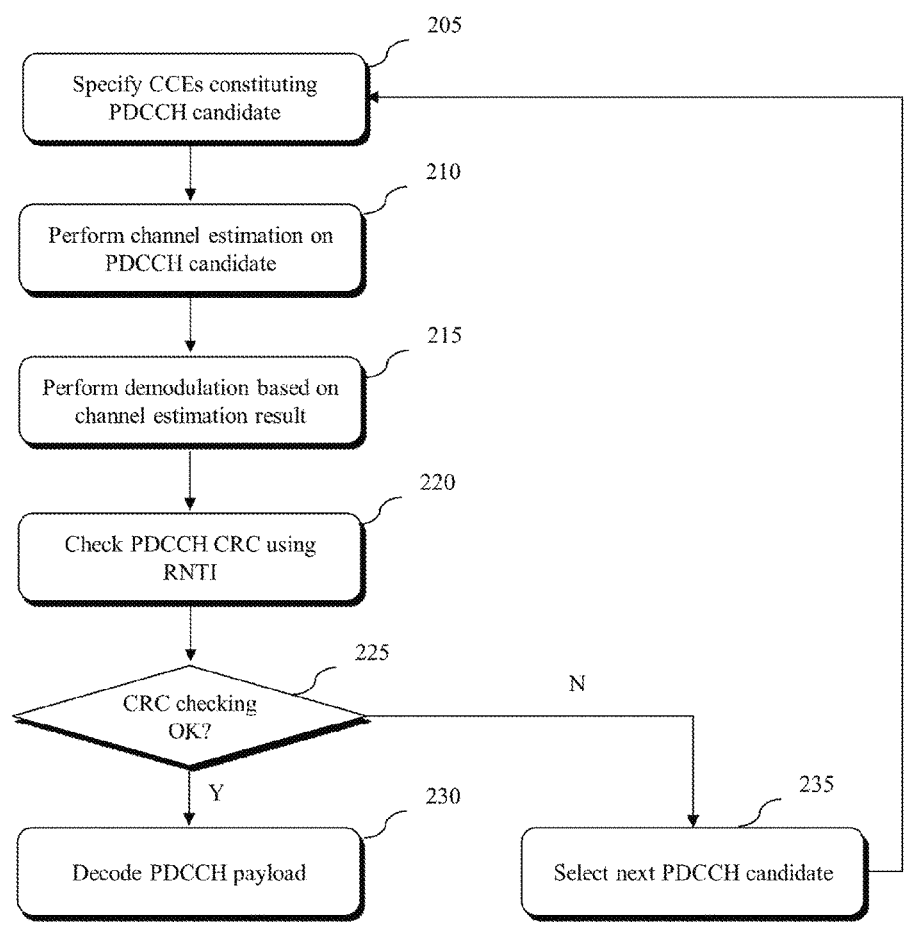
FIG. 2 illustrates an operation of conventional user equipment for a process of blind-decoding a PDCCH.

FIG. 2 illustrates an operation of conventional user equipment for a process of blind-decoding a PDCCH. An attempt to the blind-decode may include a series of processes including, for example, examining, by the user equipment, a CRC for an aggregation of resources (e.g., PDCCH candidates) on which the PDCCH is likely to be transmitted using an assigned identifier (e.g., RNTI) thereto, and upon determination that the CRC check result is positive for the PDCCH candidates, performing demodulation and decoding the PDCCH candidates by the user equipment with assuming that a PDCCH being transmitted thereto is mapped to a corresponding PDCCH candidate.

Referring to FIG. 2, the user equipment specifies 205 CCEs of a PDCCH candidate that is currently subjected to the blind-decoding among the PDCCH candidates included in the search space. One scheme of specifying the CCEs constituting the PDCCH candidate may employ a predefined hashing function. In order to avoid obscuring a key point of the present disclosure, a description of the hashing function itself is omitted. However, the details of the hashing function are disclosed in the standard document of TS 36.213.

The user equipment performs channel estimation for the PDCCH candidate based on the specified CCEs 210. For example, the user equipment UE performs channel estimation on CCEs (i.e., resources) constituting the PDCCH candidate. A reference signal may be used for the channel estimation.

The user equipment performs demodulation on the PDCCH candidate based on the channel estimation result 215. For example, based on the channel estimation result, the user equipment may acquire a complex symbol corresponding to a signal received on the CCEs constituting the PDCCH candidate. The user equipment may obtain bits corresponding to the complex symbol by performing demodulation on the obtained complex symbol.

The user equipment checks 220 bits corresponding to a PDCCH CRC using a UE identifier (e.g., C-RNTI, SI-RNTI, P-RNTI, etc.) allocated to the user equipment. The base station may scramble the PDCCH CRC via the RNTI. In this connection, the user equipment may determine via the PDCCH CRC whether a corresponding PDCCH is transmitted to itself.

When the CRC check result based on the RNTI is positive, the user equipment decodes a PDCCH payload 230. When the result of CRC check based on RNTI is negative, the user equipment selects a PDCCH candidate next to the current PDCCH candidate and again attempts to perform a PDCCH detection associated with the selected PDCCH candidate (235).

In one example, a CRS (cell specific reference signal) is used for demodulation of the LTE PDCCH. In the LTE system, the CRS is transmitted on all subframes in the time domain. The CRS is transmitted in the entire system band in the frequency domain. The CRS may be used for channel estimation for demodulation of control/data channels. The CRS may also be used for channel state information (CSI) measurements. Optionally, the CRS may also be used for radio resource management (RRM) measurements.

Since the PDCCH demodulation is performed based on the CRS transmitted in the entire system band, the user equipment may obtain a channel estimation result for the entire system band by performing DFT-based channel estimation once. The UE could derive the channel estimation result for each resource element (RE) of the PDCCH region from the channel estimation result for the entire system band.

In the NR system, a demodulation reference signal (DM-RS) is used for demodulation of the PDCCH. Unlike the CRS of legacy LTE, the DM-RS is not transmitted in the entire system band. The DM-RS may be transmitted, for example, in a frequency band in which the PDCCH is transmitted, if necessary. Further, the DM-RS may not be necessarily transmitted on all subframes.

In the NR system, a search space set for receiving the PDCCH is defined. A search space may be defined as an aggregation of candidates at a particular aggregation level (AL). The search space set may mean a set of search spaces having ALs. For example, a search space with AL 1 and a search space with AL 4 may constitute a single search space set. Configuration information for the search space set may be transmitted to the user equipment via a higher layer signaling (e.g., RRC). The configuration information for the search space set may include the AL of control channel candidates for which the user equipment should perform monitoring in the corresponding search space set, and the number of the control channel candidates for each AL. For example, the configuration information for the search space set includes the number of AL 1 candidates (e.g., 0 to 8), the number of AL 2 candidates (e.g., 0 to 8), the number of AL 4 candidates 8), the number of AL 8 candidates (e.g., 0 to 8) and the number of AL 16 candidates (e.g., 0 to 8). When the number of candidates having a corresponding AL is 0, the user equipment may not attempt blind-detection for the corresponding AL candidate. Further, the configuration information for the search space set may include information about periodicity (e.g., monitoring periodicity) at which the user equipment should monitor the corresponding search space set. One or more search space sets may be configured for the user equipment. The configuration information for the search space sets may be configured independently of each other.

The user equipment may perform blind-decoding on a large number of candidates during a specific time unit. From a network point of view, this has the advantage that scheduling flexibility may be improved because this may increase resource utilization. On the other hand, from the viewpoint of the user equipment, a decoding operation for the control channel, a reception operation of the PDSCH scheduled by the control channel, and a HARQ process in response to the PDSCH reception increase an operation complexity. This may cause a problem such as delay propagation.

In order to prevent such a problem from occurring, the maximum number of blind-decodings that the user equipment should perform during a specific time unit (e.g., 1 slot) may be defined. The maximum number of blind-decodings means the total number of candidates for which the user equipment must perform blind-decoding. Thus, the maximum number of blind-decodings may be referred to as the maximum number of the candidates which the user equipment monitors. The user equipment should be able to perform the blind-decodings the defined maximum number of times within a given time unit (e.g., one slot). The network may perform scheduling for multiple user equipments based on the maximum number of blind-decodings.

Further, since NR-PDCCH operates based on the DM-RS, the number of CCEs (or the number of REG bundles) may be defined as the number of resources for which the user equipment should perform channel estimation within a specific unit time. The user equipment performs channel estimation on a REG bundle basis. Since the number of REG bundles per CCE remains the same in the CORESET, the number of REG bundles or CCEs for which the UE should perform channel estimation in a certain time unit may be defined. The number of CCEs for which the user equipment should perform channel estimation during the unit time may mean the number of CCEs that do not overlap with each other. This is because, for overlapping CCEs, the user equipment may reuse the channel estimation result.

In one example, the maximum number of channel estimations may be defined as follows.

(i) The number of CCEs in all candidates: in one example, the number of CCEs belonging to all candidates that the user equipment should monitor for a unit time (e.g., 1 slot) may be defined as the maximum number of channel estimations. In this connection, the number of CCEs may mean the number of CCEs that do not overlap with each other.

When a Wideband RS is used, the constraint on the maximum number of channel estimation as described above may not be applied.

The Wideband RS is a type of DM-RS that is transmitted for PDCCH demodulation. The Wideband RS may be transmitted in a relatively wide frequency band. The Wideband RS is associated with the same precoding assumption by the user equipment. In a CORESET where the Wideband RS is not used, the user equipment assumes the same precoding within a 1 REG bundle. On the other hand, in a CORESET in which the Wideband RS is used, the user equipment may assume that a RS is transmitted on all the REGs in a set of consecutive resource blocks and the UE may assume the same precoding within the corresponding consecutive resource blocks. Whether or not the Wideband RS is used may be given as precoder granularity information in a CORESET configuration.

In one example, in the case of CORESET where the Wideband RS is used, the user equipment may perform DFT-based channel estimation. In this case, the complexity of channel estimation may be greatly reduced. Therefore, the constraint considering the channel estimation complexity may not be applied.

(ii) Number of REG bundles in all candidates: When the Wideband RS is used, the constraint on the maximum number of channel estimations may not be applied.

Depending on the duration of the CORESET for NR PDCCH transmission, the number of REG bundles constituting one CCE may be differently configured. Since the user equipment performs channel estimation on a REG bundle basis, the channel estimation complexity may be different between CCEs depending on the number of REG bundles per CCE. Therefore, the channel estimation complexity may be expressed based on the number of REG bundles. The channel estimation complexity may vary depending on the number of REG bundles per CCE.

(iii) Number of precoder bundles (regardless of whether the precoder bundles are the same):

When the Wideband RS is used, the number of chunks (e.g., bundles of contiguous resources) within a CORESET may define the number of precoder bundles. When the Wideband RS is used, the number of REG bundles may define the number of precoder bundles.

When the Wideband RS is used, and when data (e.g., control channel) is transmitted on consecutive resources within the CORESET in the frequency domain, a RS (e.g., the same precoding RS) is transmitted on all the REGs in a region in which the continuous resources are located. In this case, the channel estimation complexity may be expressed as the number of consecutive resources (i.e., chunks).

The maximum number of blind-decodings and the channel estimation capability as described above may be defined to be associated with each factor (e.g., whether the Wideband RS is used, the SCS numerology, and whether multiple CORESETs overlap each other). For example, as shown in Table 4 below, for a specific SCS numerology, the maximum number of blind-decodings X in one slot and the channel estimation capability (e.g., the number of CCEs or the number of REG bundles) may be predefined as Y, or may be indicated to the user equipment via higher layer signaling.

TABLE 4

| Subcarrier spacing, numerology | Maximum number of Blind decoding (i.e., candidates) | Maximum number of CCEs |
| --- | --- | --- |
| 0 (15 kHz SCS) | X | Y |
| 1 (30 kHz SCS) | A | B |
| 2 (60 kHz SCS) | C | D |
| 3 (120 kHz SCS) | E | F |
| . . . | . . . | . . . |

Further, when the channel estimation capability is defined, the number of CCEs (or REG bundles, or chunks) may refer to the number of CCEs (or REG bundles, or chunks) for which the user equipment must actually perform channel estimation. In one example, when it is assumed that the channel estimation capability is defined as the number of CCEs, and when 1 CCE is included in N control channel candidates, it may be desirable that the corresponding CCE is counted as one CCE rather than being counted as N. In other words, the number of CCEs as described above may mean the number of non-overlapping CCEs.

When, as described above, the maximum number of blind-decodings and the maximum number of REG bundles (or CCEs) are defined, there may occur a situation where the blind-decoding for some control channel candidates may need to be limited depending on the CORESET size and/or the configuration (e.g., monitoring periodicity, etc.) of each search space set.

For example, when the size of CORESEST is small, thereby causing significant resource overlaps between different candidates, the user equipment may reuse the result of the channel estimation on a REG bundle basis. As a result, the number of control channel candidates monitored by the user equipment may increase to the maximum number of the REG bundles (or CCEs).

On the other hand, when the CORESET size is large and thus there is no resource overlap between the candidates, the user equipment must perform channel estimation on all REG bundles without re-using the channel estimation result. Thus, (because this situation causes the UE capability to exceed the maximum channel estimation capability), the user equipment may be unable to perform the blind-decoding on some of the candidates configured to be subjected to the blind-decoding.

In another example, different search space sets may have different monitoring periodicities. Thus, in a certain unit time (e.g., a common multiple between the monitoring periodicities), the user equipment may need to perform blind-decoding simultaneously on different search space sets. Accordingly, the channel estimation complexity increases only in the corresponding unit time. It may happen that the user equipment has to skip the blind-decoding for some candidates. In this connection, when the network and the user equipment are supposed to skip blind-decodings for different candidates therebetween, the transmission and reception performance of the control channel may be significantly degraded due to the different understanding in terms of the candidates to be blind-decoded between the network and the user equipment.

In one embodiment of the present disclosure, in order to solve such a problem, a scheme is proposed in which when the number of candidates and/or the number of channel estimations exceeds a predetermined maximum value, the user equipment skips some of the blind-decodings configured for a corresponding search space set. That is, the user equipment may skip blind-decoding for some control channel candidates in the corresponding search space set. To this end, an approach is needed by which the user equipment selects a candidate to be subjected to the channel estimation (or a candidate configured to be subjected to the blind-decoding).

In other words, when the number of blind-decodings exceeding the channel estimation capability of the user equipment is configured for the UE, it is not necessary for the user equipment to perform blind-decoding on all candidates beyond the channel estimation capability of the UE. However, the network and the user equipment have the same understanding as to which candidate for which the user equipment skips the blind-decoding. To this end, a priority rule related to the candidate selection/drop is required.

<Priority Determination>

Approaches proposed below may be applied alone or in combination with each other. Further, the following approaches may be implicitly applied to various situations where the user equipment may arbitrarily skip a candidate without an separate signaling by the network. Alternatively, the network may instruct the user equipment to use a specific approach. Hereinafter, CORESET may be interpreted as a variety of resource units or search space sets for a configuration of a search space.

Example 1) CORESET Priority

In an NR system, multiple CORESETs may be configured for a single UE. A priority for a number of CORESETs may be defined. Depending on the factor including the channel estimation complexity, the user equipment may preferentially skip a candidate in a CORESET with low priority, if necessary. That is, the user equipment preferentially monitors a candidate in a CORESET having the highest priority, and, subsequently, the UE may perform the blind-decoding until a maximum channel estimation capability thereof is reached.

In one example where the implicit priority is applied, the priority may be determined according to the CORESET Configuration in the following manner. Alternatively, when the priority is explicitly determined/indicated by the network, signaling may be performed to determine/indicate the priority based on the CORESET configuration below.

(i) CCE-to-REG Mapping

In the NR system, the CCE-to-REG mapping type of each CORESET may be determined depending on whether interleaving is applied to each CORESET. An example of when interleaving is used may include: a case when the user equipment-common control information (e.g., cell-common control information such as system information or the user equipment group-common control information such as power/slot format) is transmitted in a corresponding CORESET, or a case when there is no feedback or inaccurate feedback on the channel state between the base station and the user equipment, thereby making it inappropriate for the base station to use UE-dedicated beamforming.

When the user equipment must perform blind-decoding for a plurality of CORESETs using the same time resource, and the UE must skip the blind-decoding for a specific candidate due to the channel estimation complexity (e.g., when the complexity exceeds a predefined maximum number of REG bundles (or CCEs)), a specific CCE-to-REG mapping type may be configured or predefined to have a higher priority.

For example, when the interleaving-applied CORESET 1 and the interleaving-free CORESET 2 are configured for the user equipment, the user equipment may preferentially perform blind-decoding for candidates belonging to the CORESET 1 to which the interleaving is applied, rather than blind-coding for candidates belonging to the CORESET 2 to which the interleaving is not applied.

(ii) RS Type (Precoder Granularity)

In one example, the priority may be determined based on precoder granularity configured for each CORESET.

As described above, the precoder granularity in the NR system may correspond to a REG bundle size in the frequency domain, or to the Wideband RS. When the Wideband RS is used and when control information is transmitted on consecutive RBs in a CORESET, the user equipment may assume followings: the RS is transmitted on all the REGs belonging to the corresponding consecutive RBs, and the same precoding is used in the corresponding consecutive RB regions.

In one example, a CORESET for which the Wideband RS is configured may have a higher priority than a CORESET for which the Wideband RS is not configured. In general, the Wideband RS may be used as an approach to cover a wide coverage or to increase a decoding performance. Further, the Wideband RS may be used when more important information is delivered to a large number of user equipment. Thus, it may be desirable to assign a higher priority to the CORESET for which the Wideband RS is configured.

In another approach, the CORESET priority may be determined by a CORESET index or the like. For example, assuming that the priority is implicitly determined, it may be predefined that the user equipment preferentially performs blind-decoding for a CORESET with the lowest (or highest) CORESET index. When the CORESET priority is determined by explicit signaling, the network may signal the priority for each CORESET.

Example 2) Search Space Set Priority

The user equipment may receive configurations for different search space sets from the network. The monitoring periodicities for different search space sets may be configured differently. In a specific time resource, different search space sets may overlap. In this case, for a specific search space set, the priority may be configured to be higher via predefinition or via network configuration (e.g., higher layer signaling). When the user equipment has to skip blind-decoding for some candidates, the user equipment may firstly skip candidates belonging to a search space set having a low priority. Thus, it is preferable for the network to identify candidates for which the user equipment will skip blind-decoding and not to map a PDCCH of the user equipment to the identified candidate. In other words, it is preferable for the network to map the PDCCH to a candidate to be monitored by the user equipment.

In this way, the priority may be determined/configured in a unit of a search space set. The priority may be determined via predefinition or network signaling. For example, the priority may be determined based on at least one of following (i) to (iv) elements. The present disclosure is not limited thereto.

(i) Search Space Type

The search space set may be largely classified into the user specific search space set (e.g., USS) and the cell-common search space set (e.g., CSS).

According to one embodiment of the present disclosure, the priority may be determined based on a DCI format that the user equipment should monitor in each search space set and/or on a search space type.

For example, the priority for the search space set related to the CSS may be configured to be higher than the priority for the search space set related to the USS. In one example, when the search space set(s) related to the CSS and the search space set(s) related to the USS overlap each other, and the user equipment cannot monitor all PDCCH candidates during the overlapping time resources (e.g., when the number of candidates to be monitored exceeds the maximum number of blind-detections and/or the number of CCEs to be subjected to the channel estimation exceeds the maximum number of CCEs), the user equipment may firstly perform PDCCH detection (e.g., blind-decoding) on candidates included in the search space set(s) related to the CSS. Further, there may occur a situation when the UE has an additional processing capability (e.g., additional blind-detection and channel estimation are available) even when the user equipment performs both the blind-detection and the channel estimation in the search space set(s) related to the CSS. In this case, the UE may attempt to detect a PDCCH in the search space set(s) related to the USS. If the capability of the user equipment reaches the maximum number of blind-detections and/or the maximum number of CCEs, the user equipment may skip blind-decoding for candidates belonging to a search space set having a low priority (e.g., a search space set related to USS).

Thus, the network should be able to distinguish between the candidates that the user equipment monitors and the candidates for that the user equipment skips the monitoring. The network may map a PDCCH to a candidate monitored by the user equipment based on the result of such distinguishing.

(ii) Aggregation Level

As described above, in the NR system, for the search space sets, a aggregation level of the candidates that the user equipment should monitor in a corresponding search space set may be specified.

In one example, the priority for each search space set may be determined based on the aggregation level configured for each search space set. For example, a search space set that is configured to have a higher aggregation level may be given a higher priority.

(iii) The Number of Candidates (or Number of CCEs, Number of REG Bundles)

The priority for each search space set may be determined based on the number of candidates (or the number of CCEs, number of REG bundles) that the UE should monitor in each search space set.

In one example, a relatively low priority may be allocated to a search space set with a large number of candidates that must be subjected to the blind-decoding. Thus, in a predetermined time resource, the user equipment can perform blind-decoding on search space sets as many as possible.

(iv) Search Space Set Index

In a similar manner to the exemplary description of the CORESET priority as discussed above, a priority may be implicitly/explicitly defined based on an index of the search space set. For example, a search space set with a lower index may be given a higher priority.

For example, when the user equipment cannot monitor both the search space set A with an index 1 and the search space set B with an index 2 (e.g., when the UE capability exceeds the number of blind-decodings and/or channel estimation capability (e.g., the number of CCEs), the UE performs blind-detection on candidates in the search space set A having a lower index. The UE may skip blind-detection for candidates in the search space set B with a higher index. In such a situation, when the base station wishes to transmit the PDCCH to the user equipment, the base station may decide to transmit a corresponding PDCCH on the search space set A with a lower index.

In this way, the priority between the search space sets is determined. Thus, even when a plurality of search space sets are configured for one user equipment, and time resource overlap between the search space sets occurs at the time corresponding to a common multiple of monitoring periodicities for the plurality of search space sets, the UE and base station may clearly determine which candidate that the base station and the user equipment should use to transmit and receive the PDCCH. Further, the blind-decoding/channel estimation for some candidates may be skipped. This may reduce the processing complexity of the user equipment.

As noted above, the priority between search space sets may be determined based on one or more of the above elements (i) to (iv). In one example, when it is assumed that the priority between the search space sets is determined based on the above elements (i) and (iv), the user equipment and base station may operate as shown in FIG. 3.

Figure 3:
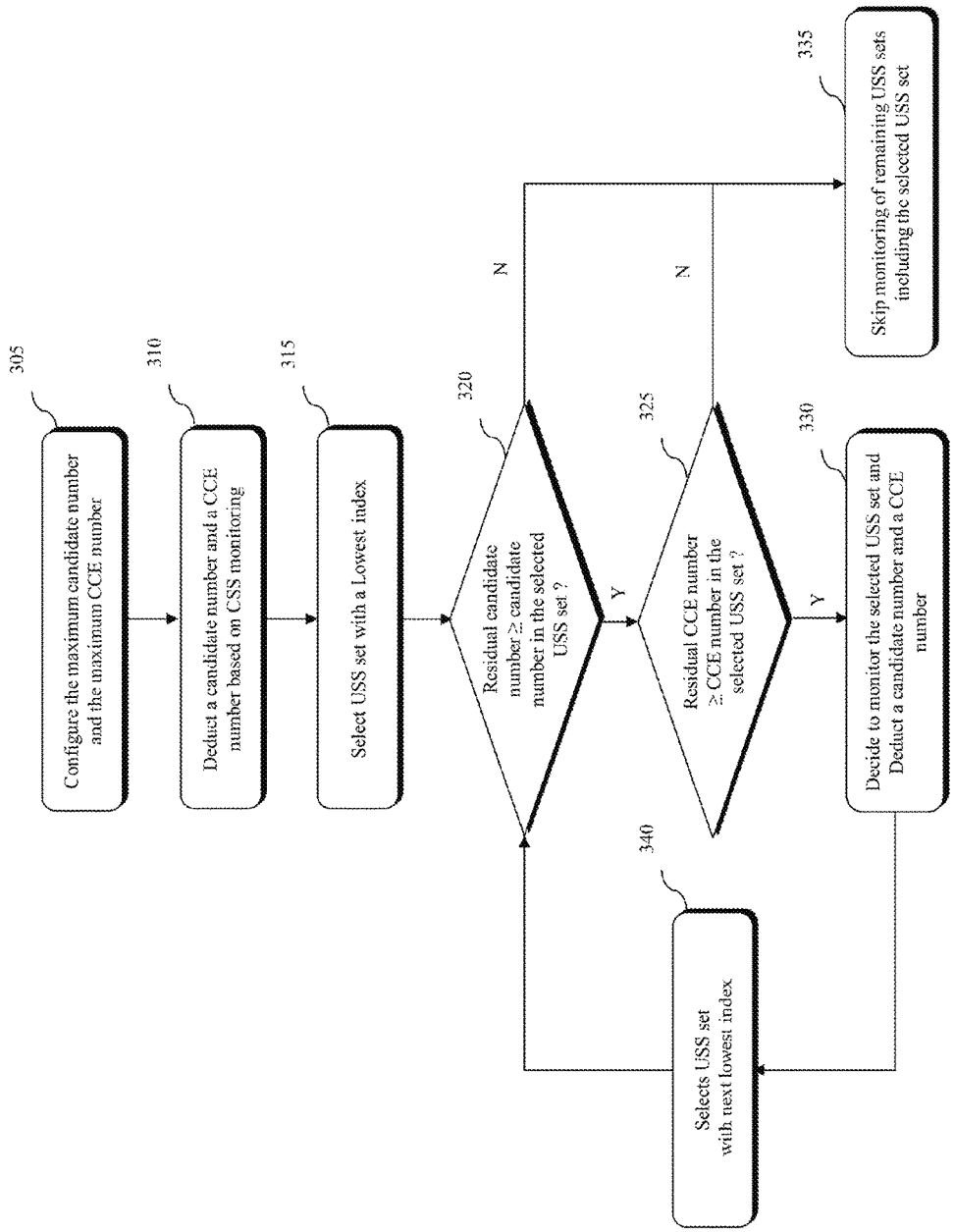
FIG. 3 shows a priority between search space sets for PDCCH blind-detection according to one embodiment of the present disclosure.

Referring to FIG. 3, the user equipment/base station may determine the maximum number of candidates to be monitored and the maximum number of channel-estimated CCEs (e.g., the maximum number of non-overlapping CCEs) during a unit time (e.g., 1 slot) 305. The maximum number of the candidates and the maximum number of CCEs may be determined based on the SCS numerology as described above.

The user equipment assigns a high priority to the search space set(s) related to the CSS. The UE preferentially performs blind-decoding on the PDCCH candidates in the search space set related to the CSS. The process of performing blind-decoding may include performing channel estimation based on the reference signal by the user equipment. For example, the user equipment performs demodulation on a PDCCH candidate based on the channel estimation result. The UE may attempt to decode based on a complex symbol obtained via the demodulation. The decoding attempt by the UE may include performing, by the user equipment, a PDCCH CRC check using the RNTI having a user equipment-specific/cell-specific/group-specific attribute allocated to the user equipment. The maximum number of blind-decodings and the maximum channel estimation capability (e.g., the maximum number of CCEs) may be subtracted 310 based on the attempt to detect the PDCCH for the CSS.

The user equipment may attempt to detect the PDCCH in the search space set(s) related to the USS based on the residual number of blind-decodings by which the UE can perform and the residual channel estimation capability of the UE. When there are a plurality of search space sets related to the USS, and the UE has to monitor the plurality of sets of search spaces simultaneously, the user equipment may consider an index of each search space set related to the USS.

For example, the user equipment performs blind-detection/channel estimation for a PDCCH candidate preferentially in a search space set corresponding to a USS having the lowest index. Then, the UE performs blind-detection/channel estimation for a PDCCH candidate in a search space set corresponding to a USS having the next lowest index. The user equipment may skip the blind-detection/channel estimation for a PDCCH candidate in a search space set corresponding to a USS having a high index resulting in that the UE capability exceeds the maximum number of blind-decodings by the user equipment or the maximum channel estimation capability of the UE.

Referring again to FIG. 3, the user equipment selects a search space set related to the USS having the lowest index 315. The user equipment subtracts the maximum number or capability by a number or capability based on the CSS monitoring. The UE determines 320 and 325 whether the residual number of candidates and the residual number of CCEs are sufficient to monitor the search space set corresponding to the currently selected USS.

When at least one of the residual number of candidates and the residual number of CCEs is not sufficient to monitor the search space set corresponding to the currently selected USS, the user equipment skips the monitoring of the remaining search space sets including the search space set corresponding to the currently selected USS 335.

To the contrary, when both of the residual number of candidates and the residual number of CCEs are sufficient to monitor the search space set corresponding to the currently selected USS, the user equipment may decide to monitor the search space set corresponding to the currently selected USS and then the UE subtracts the residual number of candidates and the residual number of CCEs by the number based on the monitoring of the search space set corresponding to the currently selected USS 330. Thereafter, the user equipment selects a search space set corresponding to a USS having the next lowest index 340.

The base station may distinguish between a search space set for which the user equipment attempts PDCCH detection and a search space set for which the UE skips PDCCH detection, as in the user equipment operation as described above. The base station may select a candidate in the search space set for which the user equipment attempts PDCCH detection and may map/transmit the PDCCH of the user equipment to/on the selected candidate.

Example 3) Aggregation Level

When the priority for skipping the monitoring of the candidate is configured, the aggregation level may be referenced. For example, a high (or low) priority is assigned to a high aggregation level. Thus, monitoring of a candidate with an aggregation level that belongs to a lower (or higher) priority may be preferentially skipped.

In another approach, the priority for each aggregation level may be determined based on the number of candidates for each aggregation level. For example, the priority for an aggregation level with a larger number of candidates to be subjected to the blind-decoding may be configured to be lower. In this way, the number of aggregation levels for which the user equipment performs blind-decoding may be increased. This may increase the scheduling flexibility of the network.

In another approach, the number of candidates for each aggregation level may be adjusted while the number of aggregation levels to to be subjected to the blind-decoding is maintained. For example, it is assumed that the user equipment should perform blind-detection on 4, 4, 2, and 2 candidates for aggregation levels (AL) 1, 2, 4, and 8, respectively. In this regard, the user equipment may preferentially select a candidate with the highest (or lowest) aggregation level one by one. In one example, the priorities of the candidates may be determined in a following order: AL8 1st candidate→AL4 1st candidate→AL2 1st candidate→AL1 1st candidate→AL8 2nd candidate→AL4 2nd candidate→AL2 2nd candidate→AL1 2nd candidate→AL2 3rd candidate→AL1 3rd candidate→AL2 last candidate→AL1 last candidate. The user equipment performs blind-detection for up to a candidate corresponding to a remaining channel estimation capability of the UE. The UE may skip the blind-detection for subsequent candidates. In this example, it is assumed that a candidate is selected in a descending order of AL, but the present disclosure is not limited thereto. Different kinds of rules may be applied. For example, an AL ascending order may be applied to select the candidate. An ascending (or descending) order of AL may be applied in an inversely proportional or forward proportional manner to a number of candidates.

When the feedback on the channel state from the user equipment is not correct, it is desirable to perform blind-decoding on various ALs. Thus, the user equipment may select a candidate to be subjected to the blind-decoding in each AL using a Round Robin approach.

Example 4) Frequency

A candidate (or CCE/REG) located at a lower (or higher) frequency may be assigned a higher priority. For example, when the user equipment (UE) performs blind-detection in a corresponding slot, the UE preferentially performs blind-detection on a candidate located at the lowest frequency.

Then, the user equipment may perform blind-detection while the UE increases (or decreases) a frequency up to a frequency value where the UE exceeds its channel estimation capability.

Example 5) Resource (e.g., Candidate, CCE, REG) Index

A resource (e.g., candidate, CCE, REG) with the lowest (or highest) index may be given highest priority. That is, when the UE performs blind-detection in a corresponding slot, a candidate with the lowest index is preferentially blind-detected by the UE. The user equipment may perform blind-detection while raising (or lowering) the index up to an index point where the UE exceeds its channel estimation capability.

In the approaches except for Example 1) above, when there are multiple CORESETs and the associated search space sets, a priority may be applied to each CORESET or each channel estimation may be applied to each CORESET based on the number of blind-detections. This may mean that a channel estimation budget is configured for each CORESET or for each search space set. For example, the user equipment distributes a predetermined channel estimation capability between CORESETs or between search space sets. Then, the UE may perform predetermined blind-decoding in each CORESET (or for each search space set) while applying the priority rule as proposed above.

A priority rule using a combination of the approaches as proposed above may be applied. For example, the user equipment may configure a priority for each CORESET, and the UE may apply a weight to a number of blind-decodings based on the priority, and, correspondingly, the UE may adjust a skip percentage of blind-detection for each CORESET. Then, the UE may use some of the above rules to select a candidate not to be subjected to the blind-detection in each CORESET.

Optionally, the user equipment may report its channel estimation capability (and/or priority rule) to the network. In response, the network may select a resource to be used for DCI transmission to the user equipment based on the report from the user equipment.

<Configurable Hashing Function>

The above description is about the priority determination method for determining a specific candidate for which the blind-detection is skipped when the blind-detection for the specific candidate should be skipped due to the channel estimation complexity.

In the following, additionally, an approach for differently configuring hashing functions between situations to reduce channel estimation complexity is proposed. The hashing function serves to inform CCEs corresponding to a candidate that the user equipment should monitor in a predetermined CORESET. For example, the user equipment may specify the CCEs constituting each candidate using the hashing function.

Approaches as described below may be applied only when a corresponding situation exceeds a maximum channel estimation capability of the user equipment.

A nested structure may be considered to reduce channel estimation complexity. The nested structure may be employed as an approach for reusing a channel estimation result between different candidates by inducing resource overlap between candidates with different aggregation levels.

In one example, for a candidate with the highest aggregation level, the user equipment applies an existing hashing function (e.g., a hashing function of the EPDCCH approach) to all CORESETs, and, then, the UE may specify CCEs constituting the candidate with the highest aggregation level. However, for candidates with lower aggregation levels, the user equipment may apply the existing hashing function to a resource occupied by the candidate with the largest aggregation level, rather than to all CORESETs. In this case, since the candidates with lower aggregation levels always belong to the resource occupied by the candidate with the highest aggregation level, the channel estimation result may be reused for the nested or overlapping resources.

According to one embodiment of the present disclosure, when the number of candidates exceeding a number corresponding to the channel estimation capability which may be performed in a specific time resource are configured for the user equipment, the user equipment may apply a hashing function for the nested structure without skipping the candidates.

In one example, when the number of candidates configured for a single search space set exceeds a channel estimation complexity that the user equipment may perform within the unit time, the user equipment/base station may assume that the nested structure is applied to the corresponding search space set. For example, in a conventional case where there is no problem in channel estimation complexity, for candidates with aggregation levels, the user equipment applies a hashing function to all CORESETs. To the contrary, when the channel estimation complexity exceeds a complexity degree that the user equipment may deal with within the unit time, the user equipment may apply a hashing function for a lower aggregation level to a resource occupied by the candidates having the largest aggregation level.

When a channel estimation complexity exceeds a tolerance due to the overlap between multiple search space sets, the above-mentioned priority determination approach and the nested structure may be used together. In one example, when a CORESET priority is configured and the channel estimation complexity exceeds the tolerance, the user equipment may apply the nested structure to a CORESET having a low priority.

In one example, the configurable hashing function may be applied as follows. The following approaches may be applied only when the current situation exceeds the UE's channel estimation capability.

When the number of potential channel estimations that the user equipment should perform for a corresponding CORESET/search space set exceeds a specific limit, parameters for configuring the nested structure may be applied to initialization of the hashing function. This may mean applying different hashing functions to the CORESET/search space sets. Alternatively, this may mean that a hashing function is applied that operates on different resource regions.

It may be determined whether the nested structure is applied to the configuration of the CORESET or search space set according to the aggregation level. For example, the user equipment/base station may assume that the nested structure is applied when AL=16 or 8 is configured. In other words, when the AL of the candidate to be subjected to blind-decoding does not include 16 or 8, a non-nested structure may be applied. Alternatively, when the number of candidates with a specific AL is greater than or equal to a specific value, the user equipment/base station may assume that the nested structure is applied. For example, when for AL=16, the number of candidates for which the user equipment should perform blind-decoding is greater than 1 (alternatively, when for AL=8, the number of candidates for which the UE should perform blind-decoding is greater than 2), the user equipment/base station may assume that a parameter (or hashing function) for configuring the nested structure is applied.

It may be determined depending on the RS type used in the CORESET or search space set, whether or not the nested structure is applied. For example, in a CORESET or search space set to which the Wideband RS is applied, the user equipment/base station may assume that the nested structure is not applied (since the channel estimation complexity does not increase significantly).

It may be determined, based on the BW of the CORESET, whether or not the nested structure is applied. When the BW of the CORESET is large, a nested structure may be needed to reduce channel estimation complexity. When the CORESET BW is small, there may occur a lot of resource overlaps between candidates even when the conventional hashing function is applied. Thus, the user equipment frequently reuses the channel estimation result. Therefore, when the CORESET BW is greater than the number of specific RBs, the user equipment/base station may assume that a parameter or hashing function for configuring the nested structure is applied.

Whether or not the nested structure is applied may be signaled to the user equipment by the network. The network may signal to the user equipment whether or not the nested structure is applied to each CORESET, using a UE-specific RRC signaling or a broadcast signal, in consideration of the user equipment distribution and the CORESET configuration. Alternatively, the base station may signal, to the user equipment, which application criterion among the plurality of nested structure application criteria as suggested above to be applied to determine whether the nested structure is applied.

It may be determined based on a CCE-to-REG mapping approach in the CORESET whether or not the nested structure is applied. For example, the user equipment/base station may determine, based on whether interleaving is applied, whether to use a nested structure or a non-nested structure. For example, in a localized mapping approach that the interleaving is not employed, the CCEs that constitute the candidate are localized. Thus, the nested structures may be easily configured. Therefore, in a case of the localized mapping approach, the nested structure is applied. In a case of a distributed mapping approach, a non-nested structure is applied. Such a nested structure application criterion may be defined in advance or may be indicated to the user equipment via a higher layer signaling, and the like by the base station.

It may be determined based on the search space type (or DCI format, RNTI) whether the nested structure is applied. For example, the user equipment/base station may use a non-nested structure for a search space set used as a CSS. The user equipment/base station may use a nested structure for a search space set used as a USS. Such a nested structure application criterion may be defined in advance or may be indicated to the user equipment via a higher layer signaling, and the like by the base station.

Further, when multiple CORESETs or search space sets overlap each other, a resource region to which the nested structure is applied may be determined according to the priority rules proposed above. For example, the user equipment may apply the nested structure to a CORESET with a high priority (or a low priority) to perform the blind-detection.

Figure 4:
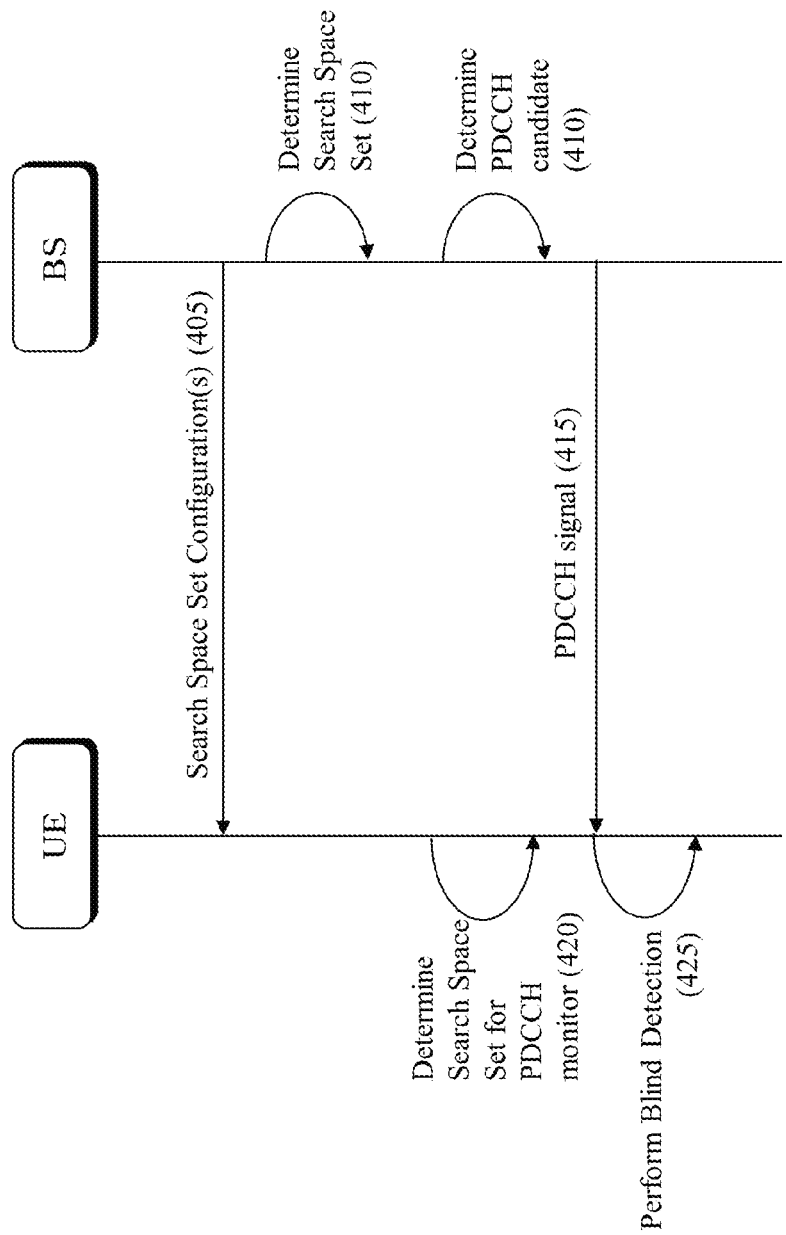
FIG. 4 illustrates a flow of a PDCCH signal transmission/reception method according to one embodiment of the present disclosure.

FIG. 4 illustrates a flow of the PDCCH signal transmission/reception method according to one embodiment of the present disclosure. FIG. 4 shows an exemplary implementation of the foregoing description. The present disclosure is not limited to the example in FIG. 4. Descriptions overlapping with those as described above may be omitted below.

Referring to FIG. 4, the base station transmits configurations for a plurality of search space sets to the user equipment 405. As described above, the configuration for each search space set may include information regarding the PDCCH monitoring periodicity, the number of candidates for each AL, the SS type (e.g., CSS/USS), and so on.

The base station may determine, based on the monitoring periodicity for each of the plurality of search space sets, search space sets for which the user equipment should monitor the PDCCH signal for a specific unit time (e.g., a specific slot). In a similar manner, the UE may determine, based on the monitoring periodicity for each of the plurality of search space sets, search space sets for which the user equipment should monitor the PDCCH signal for a specific unit time (e.g., a specific slot).

The base station may determine a PDCCH candidate for transmitting the PDCCH signal to the user equipment 410. Specifically, the base station identifies PDCCH candidates that the user equipment can monitor for a specific unit time. Then, the base station may select at least one of the PDCCH candidates that the user equipment can monitor, for the PDCCH signal transmission. When the number of PDCCH candidates and the number of CCEs included in the previously determined search space sets exceed the maximum number of candidates or the maximum number of CCEs that can be monitored by the user equipment, the base station may determine that only a part of the PDCCH candidates included in the determined search space sets can be monitored by the user equipment. In this connection, the base station assumes that the user equipment firstly monitors PDCCH candidates in a first search space set related to a common search space (CSS). Thus, the base station may determine PDCCH candidates for which the user equipment can monitor.

The base station selects PDCCH candidates can be monitored by the user equipment from the first search space set. Thereafter, the base station may determine additional PDCCH candidates that can be monitored by the user equipment until reaching the maximum number of the candidates, or until reaching the maximum number of CCEs, in a second search space set corresponding to a user equipment-specific search space (USS). The base station may determine the second search space set based on the search space set index.

The determined search space sets may include the first search space set and a plurality of second search space sets corresponding to the user equipment-specific search space (USS). The base station may assign a higher priority to a search space set having a lower search space set index among the second search space sets.

The base station may map the PDCCH signal to the selected PDCCH candidate and transmit the PDCCH signal 415.

The user equipment may perform blind-detection to receive the PDCCH signal 425. When the number of PDCCH candidates and the number of control channel elements (CCEs) included in the determined search space sets exceed the maximum number of the candidates or the maximum number of the CCEs respectively, the user equipment may attempt to selectively blind-detect only a part of the PDCCH candidates included in the determined search space sets. In the selection of PDCCH candidates for the blind-detection by the user equipment, the UE may firstly select PDCCH candidates from a first search space set related to a common search space (CSS) among the determined search space sets.

After the user equipment selects the PDCCH candidates from the first search space set, the UE may select additional PDCCH candidates for the blind-detection until reaching the maximum number of the candidates or until reaching the maximum number of CCEs, from a second search space set corresponding to the user equipment-specific search space (USS). In one example, the user equipment may determine the second search space set based on a search space set index.

The search space sets determined by the user equipment may include the first search space set and a plurality of the second search space sets corresponding to the user equipment specific search space (USS). The user equipment may assign a higher priority to a search space set having a lower search space set index among the second search space sets related to the USS.

The maximum number of candidates and the maximum number of CCEs may be values determined based on a subcarrier spacing (SCS).

The maximum number of candidates may be related to the maximum number of blind-decoding by the user equipment. The maximum number of CCEs may be related to the maximum channel estimation capability of the user equipment.

The number of CCEs included in the determined search space sets may be the number of CCEs that do not overlap with each other.

Figure 5:
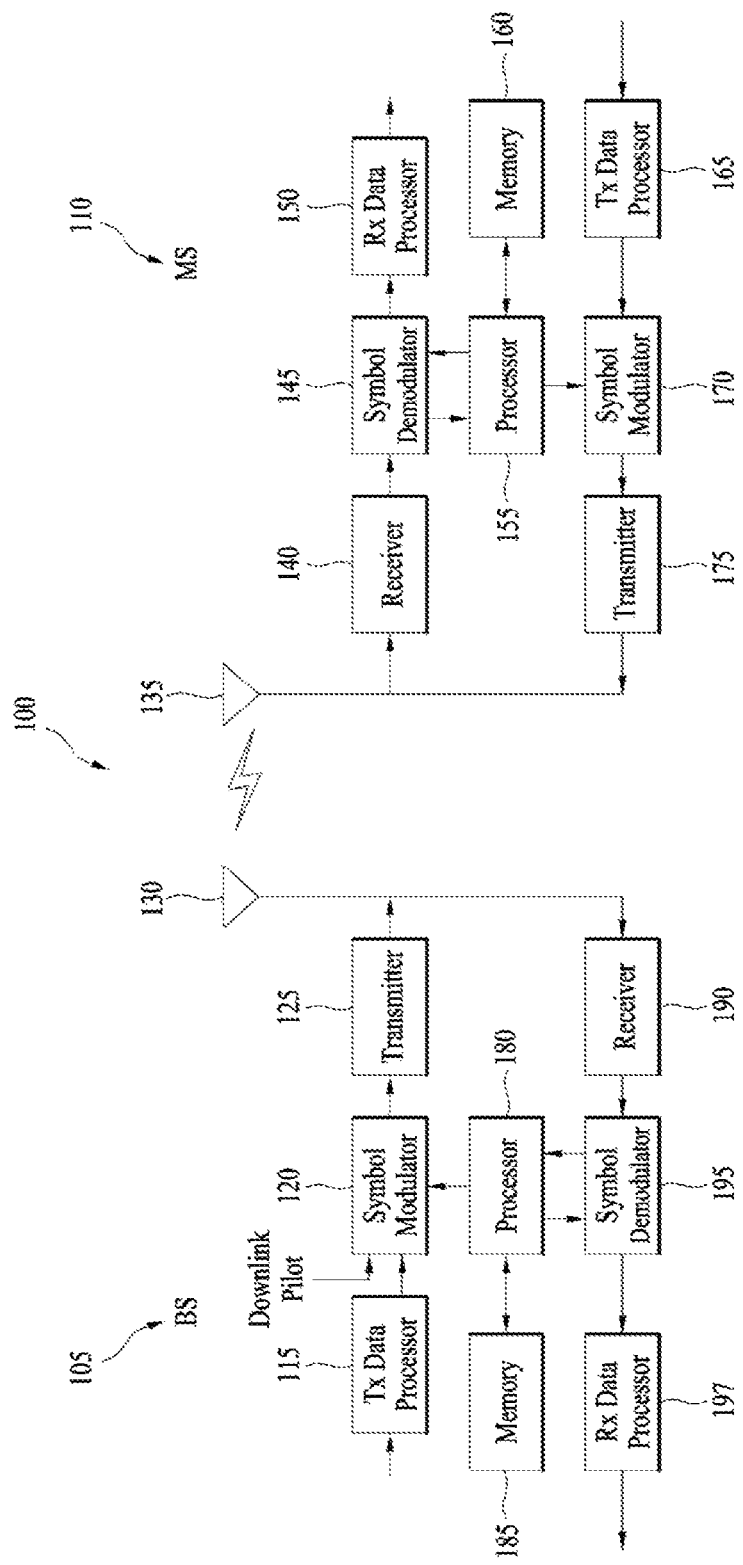
FIG. 5 illustrates user equipment and a base station according to one embodiment of the present disclosure.

FIG. 5 is a block diagram illustrating a structure of a base station (BS) 105 and a UE 110 in a wireless communication system 100 according to an embodiment of the present disclosure. The structure of the BS 105 and the UE 110 of FIG. 5 are merely an embodiment of a BS and a UE for implementing the aforementioned method and the structure of a BS and a UE according to the present disclosure is not limited to FIG. 5. The BS 105 may also be referred to as an eNB or a gNB. The UE 110 may also be referred to as a user terminal.

Although one BS 105 and one UE 110 are illustrated for simplifying the wireless communication system 100, the wireless communication system 100 may include one or more BSs and/or one or more UEs.

The BS 105 may include a transmission (Tx) data processor 115, a symbol modulator 120, a transmitter 125, a transmission/reception antenna 130, a processor 180, a memory 185, a receiver 190, a symbol demodulator 195, and a reception (Rx) data processor 197. The UE 110 may include a Tx data processor 165, a symbol modulator 170, a transmitter 175, a transmission/reception antenna 135, a processor 155, a memory 160, a receiver 140, a symbol demodulator 155, and an Rx data processor 150. In FIG. 12, although one antenna 130 is used for the BS 105 and one antenna 135 is used for the UE 110, each of the BS 105 and the UE 110 may also include a plurality of antennas as necessary. Therefore, the BS 105 and the UE 110 according to the present disclosure support a Multiple Input Multiple Output (MIMO) system. The BS 105 according to the present disclosure can support both a Single User-MIMO (SU-MIMO) scheme and a Multi User-MIMO (MU-MIMO) scheme.

In downlink, the Tx data processor 115 receives traffic data, formats the received traffic data, codes the formatted traffic data, interleaves the coded traffic data, and modulates the interleaved data (or performs symbol mapping upon the interleaved data), such that it provides modulation symbols (i.e., data symbols). The symbol modulator 120 receives and processes the data symbols and pilot symbols, such that it provides a stream of symbols.

The symbol modulator 120 multiplexes data and pilot symbols, and transmits the multiplexed data and pilot symbols to the transmitter 125. In this case, each transmission (Tx) symbol may be a data symbol, a pilot symbol, or a value of a zero signal (null signal). In each symbol period, pilot symbols may be successively transmitted during each symbol period. The pilot symbols may be an FUM symbol, an OFDM symbol, a Time Division Multiplexing (TDM) symbol, or a Code Division Multiplexing (CDM) symbol.

The transmitter 125 receives a stream of symbols, converts the received symbols into one or more analog signals, and additionally adjusts the one or more analog signals (e.g., amplification, filtering, and frequency upconversion of the analog signals), such that it generates a downlink signal appropriate for data transmission through an RF channel. Subsequently, the downlink signal is transmitted to the UE through the antenna 130.

Configuration of the UE 110 will hereinafter be described in detail. The antenna 135 of the UE 110 receives a DL signal from the BS 105, and transmits the DL signal to the receiver 140. The receiver 140 performs adjustment (e.g., filtering, amplification, and frequency downconversion) of the received DL signal, and digitizes the adjusted signal to obtain samples. The symbol demodulator 145 demodulates the received pilot symbols, and provides the demodulated result to the processor 155 to perform channel estimation.

The symbol demodulator 145 receives a frequency response estimation value for downlink from the processor 155, demodulates the received data symbols, obtains data symbol estimation values (indicating estimation values of the transmitted data symbols), and provides the data symbol estimation values to the Rx data processor 150. The Rx data processor 150 performs demodulation (i.e., symbol-demapping) of data symbol estimation values, deinterleaves the demodulated result, decodes the deinterleaved result, and recovers the transmitted traffic data.

The processing of the symbol demodulator 145 and the Rx data processor 150 is complementary to that of the symbol modulator 120 and the Tx data processor 115 in the BS 205.

The Tx data processor 165 of the UE 110 processes traffic data in uplink, and provides data symbols. The symbol modulator 170 receives and multiplexes data symbols, and modulates the multiplexed data symbols, such that it can provide a stream of symbols to the transmitter 175. The transmitter 175 obtains and processes the stream of symbols to generate an uplink (UL) signal, and the UL signal is transmitted to the BS 105 through the antenna 135. The transmitter and the receiver of UE/BS can be implemented as a single radio frequency (RF) unit.

The BS 105 receives the UL signal from the UE 110 through the antenna 130. The receiver processes the received UL signal to obtain samples. Subsequently, the symbol demodulator 195 processes the symbols, and provides pilot symbols and data symbol estimation values received via uplink. The Rx data processor 197 processes the data symbol estimation value, and recovers traffic data received from the UE 110.

A processor 155 or 180 of the UE 110 or the BS 105 commands or indicates operations of the UE 110 or the BS 105. For example, the processor 155 or 180 of the UE 110 or the BS 105 controls, adjusts, and manages operations of the UE 210 or the BS 105. Each processor 155 or 180 may be connected to a memory unit 160 or 185 for storing program code and data. The memory 160 or 185 is connected to the processor 155 or 180, such that it can store the operating system, applications, and general files.

The processor 155 or 180 may also be referred to as a controller, a microcontroller), a microprocessor, a microcomputer, etc. In the meantime, the processor 155 or 180 may be implemented by various means, for example, hardware, firmware, software, or a combination thereof. In a hardware configuration, methods according to the embodiments of the present disclosure may be implemented by the processor 155 or 180, for example, one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In one example, the processor of the user equipment receives configurations for a plurality of search space sets from a base station via a receiver of the user equipment. The processor determines search space sets for which the user equipment should monitor the PDCCH signal for a specific unit time, based on the monitoring periodicity of each of the plurality of search space sets. When the number of PDCCH candidates and the number of control channel elements (CCEs) included in the determined search space sets exceed the maximum number of candidates or the maximum number of CCEs, respectively, the processor may attempt to blind-detect selectively only a part of the PDCCH candidates included in the determined search space sets. In selection of PDCCH candidates for the blind-detection by the processor of the user equipment, the processor may firstly select PDCCH candidates from a first search space set related to a common search space (CSS) among the determined search space sets.

In one example, while the processor of the base station assumes that the user equipment preferentially monitors PDCCH candidates from the first search space set corresponding to the common search space (CSS) among the determined search space sets, the processor of the base station may determine PDCCH candidates that can be monitored by the user equipment. The processor of the base station may determine, based on the monitoring periodicity for each of the plurality of search space sets, search space sets for which the user equipment should monitor the PDCCH signal for a specific unit time (e.g., a specific slot). When the number of PDCCH candidates and the number of CCEs included in the previously determined search space sets exceed the maximum number of candidates or the maximum number of CCEs that can be monitored by the user equipment, the processor of the base station may determine that only a part of the PDCCH candidates included in the determined search space sets can be monitored by the user equipment. The processor of the base station selects at least one of PDCCH candidates can be monitored by the user equipment and transmit the PDCCH signal to the UE via the selected at least one. The processor of the base station may determine PDCCH candidates can be monitored by the user equipment under assumption that the UE may first select PDCCH candidates from a first search space set related to a common search space (CSS) among the previously determined search space sets.

In a firmware or software configuration, methods according to the embodiments of the present disclosure may be implemented in the form of modules, procedures, functions, etc. which perform the above-described functions or operations. Firmware or software implemented in the present disclosure may be contained in the processor 155 or 180 or the memory unit 160 or 185, such that it can be driven by the processor 155 or 180.

Radio interface protocol layers among the UE 110, the BS 105, and a wireless communication system (i.e., network) can be classified into a first layer (L1 layer), a second layer (L2 layer) and a third layer (L3 layer) on the basis of the lower three layers of the Open System Interconnection (OSI) reference model widely known in communication systems. A physical layer belonging to the first layer (L1) provides an information transfer service through a physical channel. A Radio Resource Control (RRC) layer belonging to the third layer (L3) controls radio resources between the UE and the network. The UE 110 and the BS 105 may exchange RRC messages with each other through the wireless communication network and the RRC layer.

The above-mentioned embodiments correspond to combinations of elements and features of the present disclosure in prescribed forms. And, it is able to consider that the respective elements or features are selective unless they are explicitly mentioned. Each of the elements or features can be implemented in a form failing to be combined with other elements or features. Moreover, it is able to implement an embodiment of the present disclosure by combining elements and/or features together in part. A sequence of operations explained for each embodiment of the present disclosure can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

While the present disclosure has been described and illustrated herein with reference to the preferred embodiments thereof, it will be apparent to those skilled in the art that various modifications and variations can be made therein without departing from the spirit and scope of the invention. Thus, it is intended that the present disclosure covers the modifications and variations of this invention that come within the scope of the appended claims and their equivalents.

INDUSTRIAL APPLICABILITY

As described above, the present disclosure may be applied to various wireless communication systems.

The invention claimed is:

1. A method for detecting a physical downlink control channel (PDCCH) signal by a user equipment in a wireless communication system, the method comprising:
receiving information on configurations for a plurality of search space sets from a base station, wherein the information on the configurations for the plurality of search space sets includes information on respective monitoring periodicities of the plurality of search space sets;
determining, based on the respective monitoring periodicities of the plurality of search space sets, search space sets in which the user equipment should monitor the PDCCH signal for a unit of time; and
performing blind-decoding for the determined search space sets,
wherein the user equipment performs the blind-decoding for the determined search space sets within a maximum number $N_{max,PDCCH}$ of PDCCH candidates that the user equipment can monitor in the unit of time, and within a maximum number Nmax,CCE of control channel elements (CCEs) that the user equipment can monitor in the unit of time, wherein the user equipment does not perform the blind decoding for PDCCH candidates that exceed the Nmax,PDCCH or the Nmax,CCE, from among PDCCH candidates included in the determined search space sets, and wherein the user equipment selects PDCCH candidates included in a first search space set first, for the blind decoding, from among the determined search space sets, the first search space set related to a common search space (CSS).

2. The method of claim 1, wherein the user equipment selects additional PDCCH candidates included in a second search space set additionally, for the blind decoding, until a number of PDCCH candidates for which the user equipment performs the blind-decoding reaches the Nmax,PDCCH or until a number of CCEs for which the user equipment performs the blind-decoding reaches the Nmax,CCE, and wherein the second search space is related to a user equipment specific search space (USS).

3. The method of claim 2, wherein the user equipment determines the second search space set based on a search space set index.

4. The method of claim 1, wherein the search space sets determined by the user equipment include the first search space set, and a plurality of second search space sets related to a user equipment-specific search space (USS), wherein the user equipment assigns a higher priority to a search space set having a lower search space set index among the second search space sets.

5. The method of claim 1, wherein the Nmax,PDCCH and the Nmax,CCE are values determined based on a subcarrier spacing (SCS).

6. The method of claim 1, wherein the Nmax,PDCCH is related to a maximum number of blind-decoding attempts that the user equipment can perform, wherein the Nmax,CCE is related to a maximum channel estimation capability of the user equipment.

7. The method of claim 1, wherein a number of CCEs included in the determined search space sets is a number of CCEs non-overlapping with each other.

8. The method of claim 1, wherein the information on the configurations of the plurality of search space sets includes information on aggregation levels for each of the plurality of search space sets, and information on a number of candidates per aggregation level.

9. A method for transmitting a physical downlink control channel (PDCCH) signal by a base station in a wireless communication system, the method comprising:

transmitting information on configurations for a plurality of search space sets to a user equipment, wherein the information on the configurations for the plurality of search space sets includes information on respective monitoring periodicities of the plurality of search space sets;

determining, based on the respective monitoring periodicities of the plurality of search space sets, search space sets for which the user equipment should monitor the PDCCH signal for a unit of time; and transmitting the PDCCH signal in the determined search space sets, wherein the PDCCH signal is transmitted using at least one of PDCCH candidates that can be monitored in the unit of time by the user equipment, wherein the PDCCH candidates that can be monitored in the unit of time by the user equipment are determined, from among PDCCH candidates included in the determined search space sets, based on a maximum number Nmax,PDCCH of the PDCCH candidates that the user equipment can monitor in the unit of time and a maximum number Nmax,CCE of control channel elements (CCEs) that the user equipment can monitor in the unit of time, wherein the PDCCH signal is not transmitted using PDCCH candidates that exceed the Nmax,PDCCH or the Nmax,CCE, and wherein the PDCCH candidates that can be monitored in the unit of time by the user equipment include PDCCH candidates included in a first search space set first from among the determined search space sets, the first search space set related to a common search space (CSS).

10. The method of claim 9, wherein the PDCCH candidates that can be monitored in the unit of time by the user equipment include PDCCH candidates included in a second search space set related to a user equipment specific search space (USS) additionally, until a number of PDCCH candidates that can be monitored in the unit of time by the user equipment reaches the Nmax,PDCCH or until a number of CCEs that can be monitored in the unit of time by the user equipment reaches the Nmax,CCE.

11. The method of claim 10, wherein the base station determines the second search space set based on a search space set index.

12. The method of claim 9, wherein the search space sets determined by the base station include the first search space set, and a plurality of second search space sets corresponding to a user equipment-specific search space (USS), wherein the base station assigns a higher priority to a search space set having a lower search space set index among the second search space sets.

13. The method of claim 9, wherein the Nmax,PDCCH and the Nmax,CCE are values determined based on a subcarrier spacing (SCS).

14. The method of claim 9, wherein a number of CCEs included in the determined search space sets is a number of CCEs non-overlapping with each other.

15. The method of claim 9, wherein the information on the configurations of the plurality of search space sets includes information on aggregation levels for each of the plurality of search space sets, and information on a number of candidates per aggregation level.

16. A user equipment (UE) for detecting a physical downlink control channel (PDCCH) signal, the UE comprising:

a receiver; and a processor configured to control the receiver, the processor configured to:

receive information on configurations for a plurality of search space sets via the receiver from a base station, determine, based on respective monitoring periodicities of the plurality of search space sets, search space sets in which the user equipment should monitor a PDCCH for a unit of time, wherein the information on the configurations for the plurality of search space sets includes information on the respective monitoring periodicities of the plurality of search space sets, and perform blind-decoding for the determined search space sets, wherein the processor is configured to perform the blind-decoding for the determined search space sets within a maximum number $N_{max,PDCCH}$ of PDCCH candidates that the user equipment can monitor in the unit of time, and within a maximum number $N_{max,CCE}$ of control channel elements (CCEs) that the user equipment can monitor in the unit of time, wherein the processor does not perform the blind decoding for PDCCH candidates that exceed the $N_{max,PDCCH}$ or the $N_{max,CCE}$, from among PDCCH candidates included in the determined search space sets, and wherein the processor is configured to select PDCCH candidates included in a first search space set first, for the blind decoding, from among the determined search space sets, the first search space set related to a common search space (CSS).

17. The user equipment of claim 16, wherein the information on the configurations of the plurality of search space sets includes information on aggregation levels for each of the plurality of search space sets, and information on a number of candidates per aggregation level.

18. A base station (BS) for transmitting a physical downlink control channel (PDCCH) signal, the BS comprising:

a transmitter; and a processor to control the transmitter, the processor configured to:

transmit information on configurations for a plurality of search space sets via the transmitter to a user equipment, wherein the information on the configurations for the plurality of search space sets includes information on respective monitoring periodicities of the plurality of search space sets, determine, based on the respective monitoring periodicities of the plurality of search space sets, search space sets for which the user equipment should monitor the PDCCH signal for a unit of time; and transmit the PDCCH signal in the determined search space sets via the transmitter, wherein the PDCCH signal is transmitted using at least one of PDCCH candidates that can be monitored in the unit of time by the user equipment, wherein the PDCCH candidates that can be monitored in the unit of time by the user equipment are determined, from among PDCCH candidates included in the determined search space sets, based on a maximum number $N_{max,PDCCH}$ of PDCCH candidates that the user equipment can monitor in the unit of time and a maximum number $N_{max,CCE}$ of control channel elements (CCEs) that the user equipment can monitor in the unit of time, wherein the PDCCH signal is not transmitted using PDCCH candidates that exceed the $N_{max,PDCCH}$ or the $N_{max,CCE}$, and wherein the PDCCH candidates that can be monitored in the unit of time by the user equipment include PDCCH candidates included in a first search space set first from among the determined search space sets, the first search space set related to a common search space (CSS).

19. The base station of claim 18, wherein the information on the configurations of the plurality of search space sets includes information on aggregation levels for each of the plurality of search space sets, and information on a number of candidates per aggregation level.

* * * * *